(12) United States Patent
Coleman et al.

(10) Patent No.: US 10,326,659 B2
(45) Date of Patent: *Jun. 18, 2019

(54) DEVICE AND METHOD FOR AUTOMATIC SWITCHING OF COMMUNICATION PROTOCOL OF NETWORK DEVICES BASED ON USER ACTION

(71) Applicant: TRANE INTERNATIONAL INC., Davidson, NC (US)

(72) Inventors: Howard Coleman, Roseville, MN (US); Jonathan Glaser, Maplewood, MN (US); John L. Hartman, Minneapolis, MN (US); Maheshwaran Mahendran, Tamil Nadu (IN); Timothy James Dishop, Roseville, MN (US); Aaron Opatz, Minneapolis, MN (US); David Amyotte, St. Paul, MN (US); Joel C. Vanderzee, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,726

(22) Filed: Sep. 11, 2017

(65) Prior Publication Data

US 2018/0097699 A1 Apr. 5, 2018

Related U.S. Application Data

(63) Continuation of application No. 14/282,631, filed on May 20, 2014, now Pat. No. 9,762,445.

(30) Foreign Application Priority Data

May 20, 2013 (IN) .......................... 1499/DEL/2013

(51) Int. Cl.
*G06F 15/16* (2006.01)
*H04L 12/24* (2006.01)
(Continued)

(52) U.S. Cl.
CPC ...... *H04L 41/0886* (2013.01); *H04L 12/2836* (2013.01); *H04L 67/12* (2013.01); *H04L 69/08* (2013.01); *H04L 2012/285* (2013.01)

(58) Field of Classification Search
CPC ..... H04L 69/08; H04L 67/12; H04L 41/0886; H04L 12/2836; H04L 2012/285
See application file for complete search history.

(56) References Cited

U.S. PATENT DOCUMENTS

| 6,996,600 B2 | 2/2006 | Gagner et al. |
| 7,158,525 B2 | 1/2007 | Daffner et al. |

(Continued)

FOREIGN PATENT DOCUMENTS

| KR | 1020070072260 | 7/2007 |
| WO | 2010071319 | 6/2010 |

*Primary Examiner* — Aftab N. Khan
(74) *Attorney, Agent, or Firm* — Hamre, Schumann, Mueller & Larson, P.C.

(57) ABSTRACT

A computer implemented method for automatically switching communication protocols. The method includes detecting a user input, determining, based on the user input, a first communication protocol needed to address the user input, and creating a virtualized network wherein devices that use a second communication protocol are represented via virtualized devices according to the first communication protocol.

15 Claims, 4 Drawing Sheets

(51) Int. Cl.
    *H04L 29/06*     (2006.01)
    *H04L 29/08*     (2006.01)
    *H04L 12/28*     (2006.01)

(56) References Cited

U.S. PATENT DOCUMENTS

| | | |
|---|---|---|
| 7,532,950 B2 | 5/2009 | Cha et al. |
| 7,676,300 B2 | 3/2010 | Kim et al. |
| 7,826,906 B2 | 11/2010 | Gough et al. |
| 7,831,339 B2 | 11/2010 | Kim et al. |
| 7,912,586 B2 | 3/2011 | Cha et al. |
| 7,974,740 B2 | 7/2011 | Kim et al. |
| 8,055,387 B2 | 11/2011 | McCoy et al. |
| 8,635,320 B2 | 1/2014 | Ishizaka |
| 2001/0039190 A1* | 11/2001 | Bhatnagar ............ D06F 39/005 455/450 |
| 2002/0120671 A1 | 8/2002 | Daffner et al. |
| 2003/0065707 A1 | 4/2003 | Gagner et al. |
| 2004/0204793 A1* | 10/2004 | Yoon ................. G05D 23/1905 700/277 |
| 2005/0190058 A1* | 9/2005 | Call ..................... G01N 1/2208 340/539.26 |
| 2006/0028997 A1* | 2/2006 | McFarland ......... H04L 12/2803 370/252 |
| 2011/0022346 A1* | 1/2011 | Rossi ................. H04L 12/2825 702/130 |
| 2011/0112690 A1 | 5/2011 | Caron et al. |
| 2013/0297080 A1 | 11/2013 | Ko et al. |
| 2013/0339292 A1 | 12/2013 | Park et al. |

\* cited by examiner

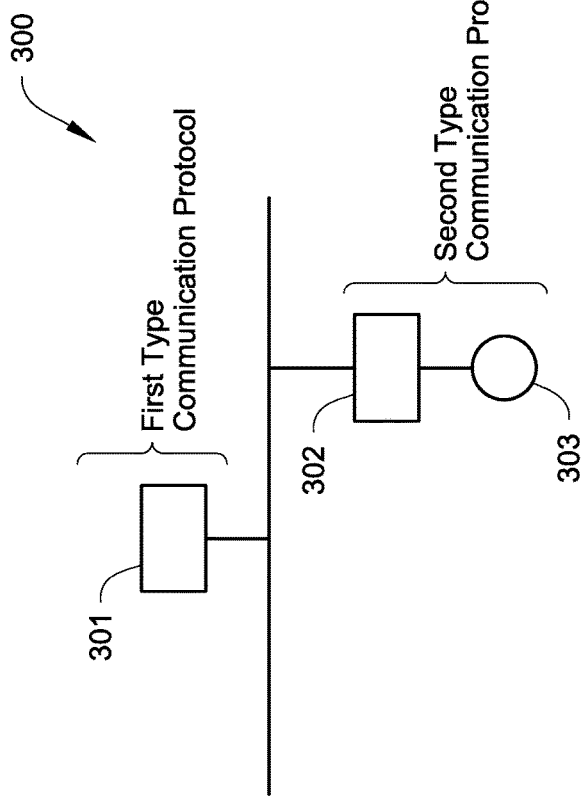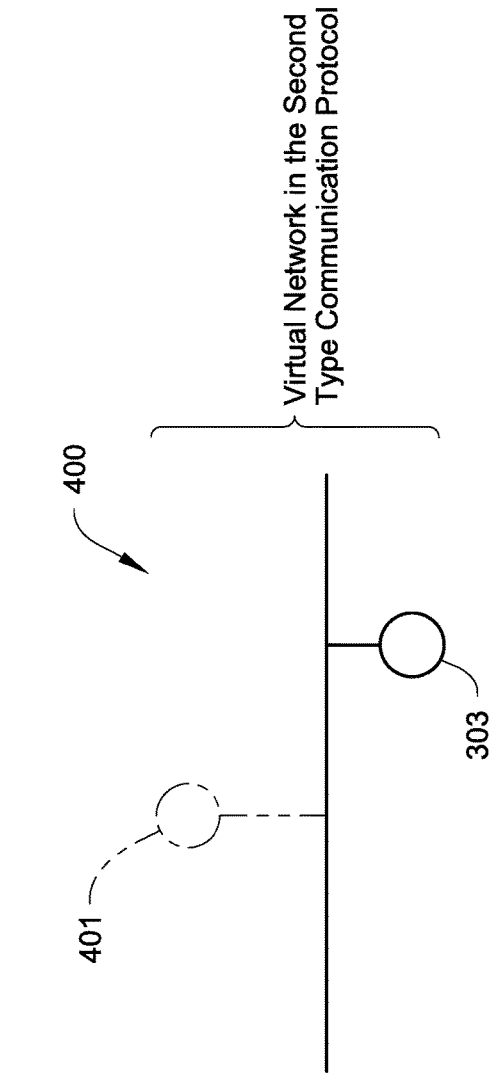
Fig. 3
Fig. 4

DEVICE AND METHOD FOR AUTOMATIC SWITCHING OF COMMUNICATION PROTOCOL OF NETWORK DEVICES BASED ON USER ACTION

FIELD

This disclosure generally relates to a device and method for controlling multiple devices connected to two or more different network protocols, wherein one of the protocols can be a building automation and control network (BACnet).

BACKGROUND

A heating, ventilation, and air conditioning (HVAC) system can have devices that use different types of connections (e.g., communication protocols) for controlling an environment of a building (or a zone of the building). For example, a HVAC system in a building may have a non-BACnet network (e.g., a network having a protocol that is different from the BACnet protocol) connected to multiple non-BACnet devices, and a BACnet network connection to various state-of-the-art BACnet devices.

SUMMARY

An embodiment is a device for automatic communication protocol switching between devices connected to one or more computer network system(s) (e.g., for, but not limited to, a HVAC system). The device includes a processor, a network interface connected to the processor, and a memory connected to the processor, including computer-readable and processor executable computer instructions for translating a first communication protocol to a second communication protocol based on a type of data received via the network interface. The type of data can be, for example, a user action, which includes but are not limited by an input made by a user and an output request made by the user. The user can be an end user and/or a technician.

An embodiment of a computer implemented method for automatically switching communication protocols includes detecting a user input, determining, based on the user input, a first communication protocol needed to address the user input, and creating a virtualized network, wherein devices that use a second communication protocol are represented via virtualized devices according to the first communication protocol. The creating step can be on-the-fly, in real time, based on the user's input. An embodiment of the method can include creating the virtualized network on-the-fly (e.g., in real time, as the user's input is received).

An embodiment of a device for automatic communication protocol switching between devices connected to a computer network system includes a processor; a network interface connected to the processor; and a memory connected to the processor, including computer-readable and processor executable computer instructions for translating a first communication protocol to a second communication protocol based on a type of data received via the network interface. The computer network system can include a HVAC system.

In an embodiment, the first communication protocol is a BACnet protocol, and the second communication protocol is a non-BACnet protocol.

In another embodiment, the first communication protocol is a non-BACnet protocol, and the second communication protocol is a BACnet protocol.

The processor can receive data according to a first communication protocol via the network interface, and the processor can execute the computer instructions and translates the data received from the first communication protocol to the second communication protocol.

Further, the processor can transmit the data using the second communication protocol to another device via the network interface.

An embodiment of a computer network system includes a network; a first computer network device connected to the network, wherein the computer network device is configured to use a first communication protocol; a virtualized network creating device connected to the network, wherein the virtualized network creating device is connected to the first computer network device and creates a virtual computer network device in a computer-readable memory, wherein the virtualized network creating device automatically translates an interaction with the virtual computer network device via the virtualized network creating device to an interaction with the first computer network device.

In an embodiment of the computer network system, the virtualized network creating device is configured to provide a user interface for receiving a user input for communicating with the virtual computer network device.

In an embodiment of the computer network system, the user interface does not allow user input to the first computer device using the first communication protocol.

Another embodiment of the computer network system further includes a second computer network device connected to the network, wherein the second computer network device is configured to use a second communication protocol.

In an embodiment, the virtualized network creating device is configured to receive data from the second computer network device and then automatically switch the data from the second communication protocol to the first communication protocol.

In an embodiment, the virtualized network creating device is configured to receive data from the first computer network device and then automatically switch the data from the first communication protocol to the second communication protocol.

In an embodiment, the first communication protocol is a BACnet protocol, and the second communication protocol is a non-BACnet protocol.

In an embodiment, the first communication protocol is a non-BACnet protocol, and the second communication protocol is a BACnet protocol.

In an embodiment, the computer network system further comprises a HVAC system.

An embodiment of a computer implemented method for automatically switching communication protocols includes the steps of detecting a user input to a computer device connected to a network; determining, based on the user input, a first communication protocol needed to address the user input; and creating a virtualized network wherein devices that use a second communication protocol are represented via virtualized devices according to the first communication protocol.

An embodiment of the method includes the first communication protocol being a BACnet protocol.

In an embodiment of the method, the first communication protocol is a non-BACnet protocol.

In an embodiment of the method, the second communication protocol is a BACnet protocol.

In an embodiment of the method, the second communication protocol is a non-BACnet protocol.

BRIEF DESCRIPTION OF THE DRAWINGS

FIG. 3 illustrates an exemplary diagram of an embodiment of two types of networks.

FIG. 4 illustrates an exemplary diagram of a single virtual network of the two networks shown in FIG. 3 according to an embodiment.

DETAILED DESCRIPTION

The embodiments disclosed are directed towards a device and method for automated switching of communication protocol based on a user action in regards to a computer network system, which includes, but is not limited to, a HVAC system. For example, in regards to a HVAC system, the embodiments are directed towards automated switching of communication protocols for devices that use different communication protocols (e.g., BACnet protocol and non-BACnet protocol). BACnet Objects have a standard protocol (i.e., BACnet protocol) for communicating data therebetween. Generally, devices using non-BACnet communication protocols (e.g., a proprietary protocol) may not be able to communicate with BACnet Objects directly. For example, a controller that communicates to devices via the proprietary protocol may require more bandwidth to pass a given amount of information than a controller communicating to a BACnet device via BACnet protocol.

The device and method disclosed are directed to automatically conserving bandwidth during communication across two or more different communication protocols, by automatically switching communication protocols based on user action.

For example, embodiments of the device and method are directed to connecting devices that use different protocols and creating a single virtual network, and providing a user with a single (virtual or semi-virtual) network-type, so that from the user's perspective, there is only one type of network (e.g., a BACnet network, a propriety network, etc.) and one type of devices (BACnet devices, propriety protocol devices, etc.) that the user is interacting with. In other embodiments, there can be more than one type of network and/or more than one type of devices that the user can interact with.

The device and method provides for automatic switching of protocols based on the user's interaction with the BACnet Objects and/or other non-BACnet devices (or devices that use a communication protocol that is not BACnet protocol).

Figure 1:
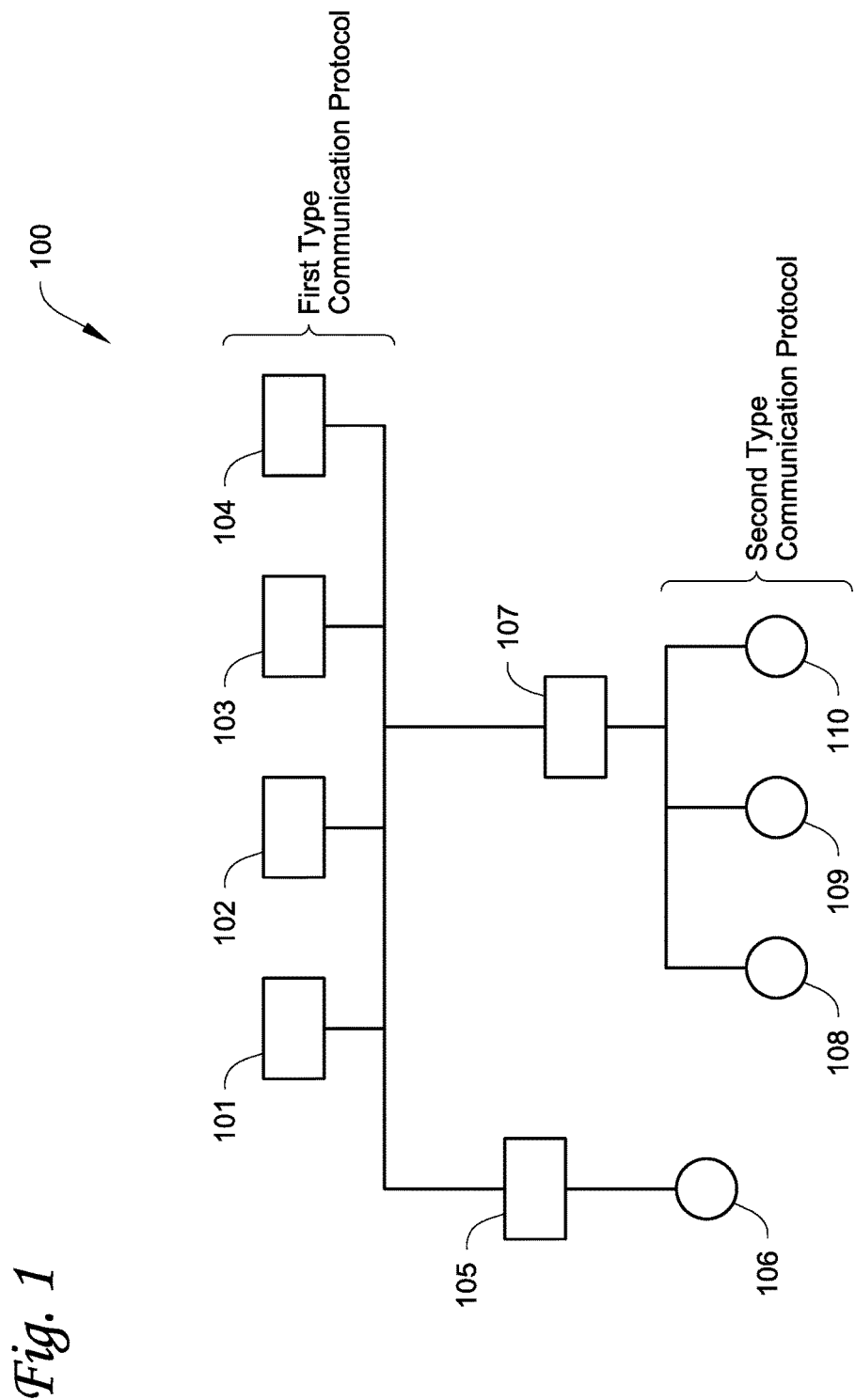
FIG. 1 illustrates an exemplary diagram of an embodiment of two types of networks.

FIG. 1 shows a network 100 of a computer network system (e.g., a HVAC system) with a plurality of first type communication protocol devices (e.g., BACnet devices) 101, 102, 103, 104. The network 100 includes an automatic switch device 105 connected to a second type communication protocol device 106 (e.g., a non-BACnet device, such as a device that uses a proprietary communication protocol). The network 100 includes another automatic switch device 107 connected to a plurality of second type communication protocol devices 108, 109, 110 (e.g., non-BACnet devices, such as devices that use a proprietary communication protocol). One or more of the automatic switch devices 105, 107 can be gateway devices.

Figure 2:
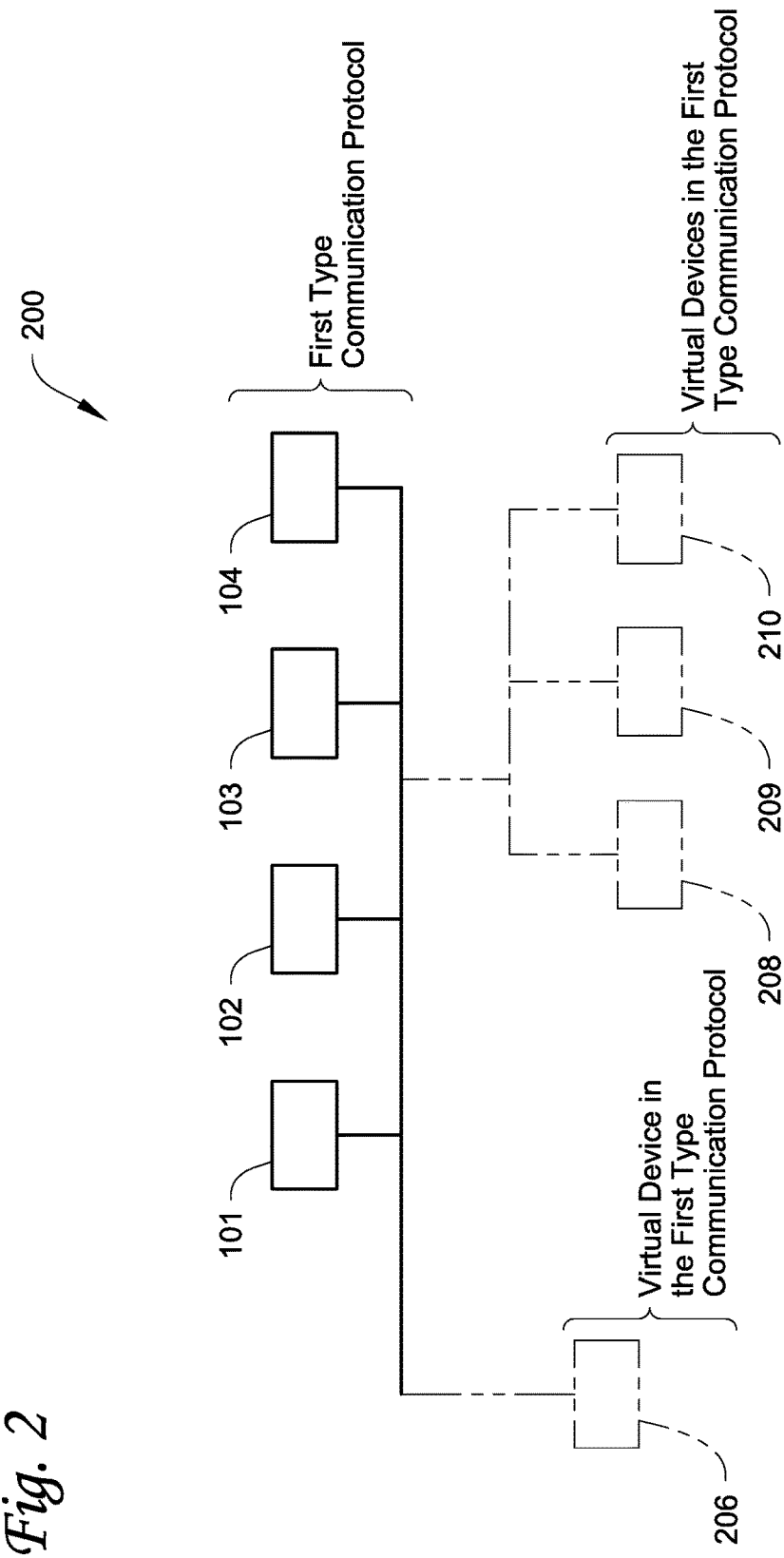
FIG. 2 illustrates an exemplary diagram of a single virtual network of the two networks shown in FIG. 1 according to an embodiment.

FIG. 2 shows a virtual network 200 of the computer network system shown in FIG. 1. The virtual network 200 is called "virtual" because the network 200 includes one or more virtualized devices. The plurality of first type communication protocol devices 101, 102, 103, 104 can remain as they are (i.e., they are not virtualized), because the virtual network 200 continues to use the first type communication protocol. The virtual network 200 includes virtual device 206, which is a virtualized version of the second type communication protocol device 106 (shown in FIG. 1). The second type communication protocol device 106 is invisible in the virtual network 200. By the term "invisible" means that a user interacting with the virtual network 200 can be unaware that the virtual device 206 is in fact a virtual representation of the second type communication protocol device 106 in the network 200, and the user can be unaware that the network 200 is a virtual network.

The automatic switch device 105 carries out the necessary conversion and/or translation of communication between the second type communication protocol device 106 and the first type communication protocol network (e.g., the network 100) as needed by a user action with the computer network system. For example, for a computer network system that is a HVAC system, a proprietary protocol may require more bandwidth to communicate information than the BACnet protocol. If a user action does not need to use the larger bandwidth to communicate a particular information, then the automatic switch device 105 performs a method of switching the communication protocol to BACnet protocol so that a subset of the total bandwidth is used during the information communication to the user. That is, unnecessary bandwidth is not used in the network, which speeds up the communication speed and alleviates network traffic from communicating unnecessary and/or unrequested bandwidth and/or data.

The automatic switch device 105 carries out the necessary conversion and/or translation of communication between the network 100 and the second type communication protocol device 106 as needed by a user action with the computer network system. Thus, the automatic switch device 105 can act as a creator of the virtual device 206 in the virtual network 200.

The automatic switch device 107 is configured to carry out the necessary conversion and/or translation of communication between the second type communication protocol devices 108, 109, 110 and the first type communication protocol network (e.g., the network 100) as needed by a user action with the computer network system. The automatic switch device 107 carries out the necessary conversion and/or translation of communication between the network 100 and the second type communication protocol devices 108, 109, 110 as needed by a user action with the computer network system. Thus, the automatic switch device 107 can act as a creator of the virtual devices 208, 209, 210 in the virtual network 200.

Advantageously, a user can be aware of the virtual network 200 and not be aware of the fact that there are second type communication protocol devices 106, 108, 109, 110 connected to the network of the computer network system. Further, the user can be unaware that there are automatic switch devices 105, 107 connected to the network 200. Accordingly, the automatic switch devices 105, 107 can be designated as virtualized network creating devices.

FIG. 3 shows a network 300 of a computer network system (e.g., a HVAC system) with a first type communication protocol device 301 (e.g., BACnet device). The network 300 includes an automatic switch device 302 connected to a second type communication protocol device 303 (e.g., device using a non-BACnet protocol).

FIG. 4 shows a virtual network 400 of the computer network system shown in FIG. 3. The second type communication protocol device 303 remains as it is, because the virtual network 400 is the second type communication protocol representation of the network 300. That is, the virtual network 400 uses the second type communication protocol (e.g., non-BACnet protocol, proprietary protocol, etc.). The virtual network 400 includes a virtual device 401, which is a virtualized version of the first type communication protocol device 301 (shown in FIG. 3). The first type communication protocol device 301 is invisible in the virtual network 400.

The automatic switch device 302 carries out the necessary conversion and/or translation of communication between the first type communication protocol device 301 and the second type communication protocol network 400 as needed by a user action with the computer network system.

Advantageously, a user can be aware of the virtual network 400 and not be aware of the fact that there is a first type communication protocol device 301 connected to the network of the computer network system. Further, the user can be unaware that there is the automatic switch device 302 that is connected to the network 400. Accordingly, the automatic switch device 302 can be designated as a virtualized network creating device.

An example of the automatic switch device (e.g., 105, 107, 302) is a controller that is connected to a network of the computer network system. An example of the automatic switch device 105, 107, 302 is a technician's service tool device (e.g., a mobile computer device including specialized hardware and/or software for HVAC) that is connected to a network of the computer network system (e.g., HVAC system).

Figure 5:
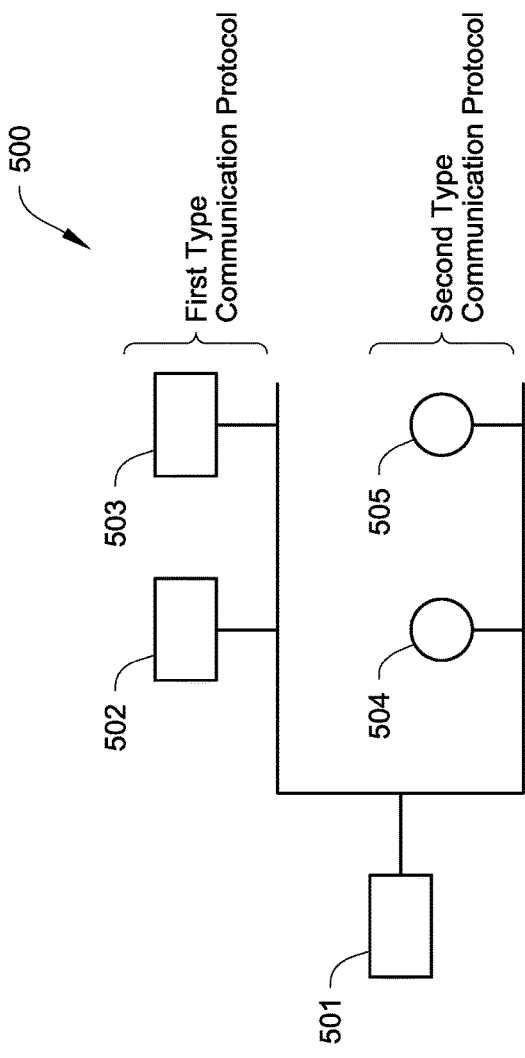
FIG. 5 illustrates an exemplary diagram of an embodiment of two types of networks.

FIG. 5 shows a network 500 of a computer network system (e.g., HVAC system) connected with a service tool device 501, which is generally used by a technician for installing and/or servicing the computer network system. The network 500 includes first type communication protocol devices 502, 503 (e.g., BACnet devices). The network 500 includes second type communication protocol devices 504, 505 (e.g., devices using a non-BACnet communication protocol).

Figure 6:
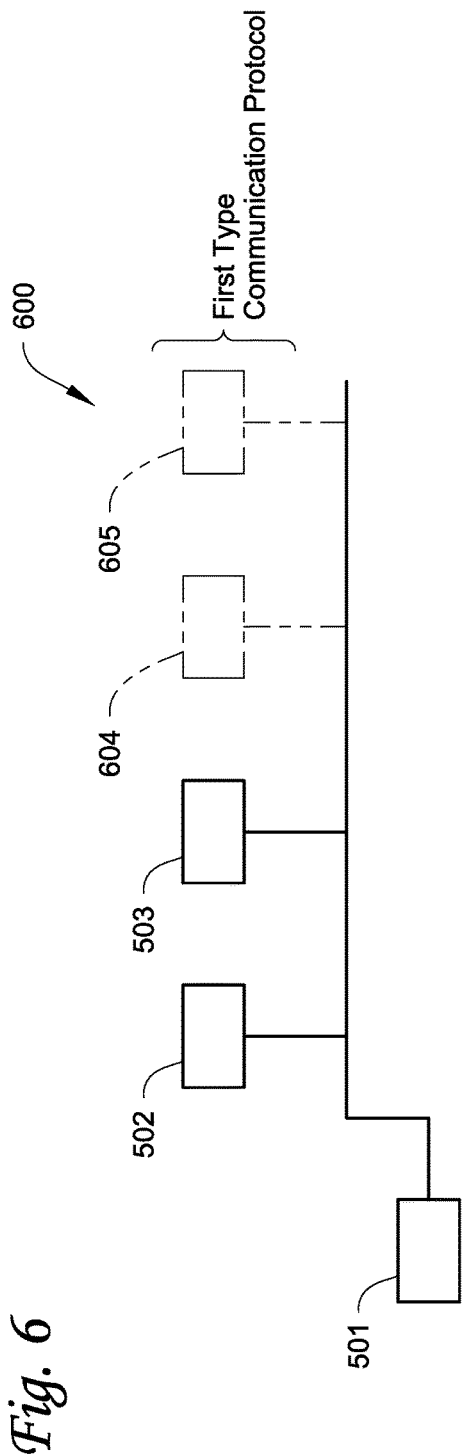
FIG. 6 illustrates an exemplary diagram of a single virtual network of the two networks shown in FIG. 5 according to an embodiment.

When the service tool device 501 "sees" the network 500, the service tool device 501 virtualizes the network 500 into a virtual network 600 shown in FIG. 6. The service tool device 501 has a user interface which displays and provides information about the network 500 in such a way that the technician is aware of the virtual network 600, and not the real structure of the network 500. Accordingly, the technician interacts with the virtual network 600 via the service tool device 501, and the service tool device 501 converts and/or translates user action of the technician and communicates the user action to the network 500 and devices 502, 503, 504, 506 connected on the network 500. Accordingly, the service tool device 501 can be designated as a virtualized network creating device.

The virtual network 600 uses the first type communication protocol. Thus, the virtual network 600 provided to the technician by the service tool device 501 includes the devices 502, 503 and virtual devices 604, 605. The virtual device 604 is a virtualized version of device 504. The virtual device 605 is a virtualized version of device 505. The virtual devices 604, 605 reside only in the service tool device 501 (e.g., processor and/or memory of the service tool device 501). The virtual network 600 may use the second type communication protocol, wherein the appropriate devices are virtualized by the service tool device 501.

The service tool device 501 is configured with hardware and/or software for carrying out the necessary conversion and/or translation of communication between the second type communication protocol devices 504, 505 and the first type communication protocol network 600 as needed by the technician and/or the service tool device 501 (e.g., user action).

Advantageously, the technician can be aware of and interact with the virtual network 600 and not with two different types of communication protocols. This can advantageously speed up the technician's duties in interacting with and/or communicating with the computer network system.

When creating a virtual device in a virtualized network, and/or during use of the virtual network, there may be a situation where a device on the network cannot itself provide the information necessary using the communication protocol of the virtual network. In such situations, the communication protocol can be switched to another communication protocol, as needed, in order to attempt to communicate (e.g., obtain) the necessary information.

For example, a BACnet communication with a controller may fail because a BACnet property ID is not implemented or the controller uses an older firmware where the required BACnet property ID is not available on the controller. The service tool device 501 can have stored therein (e.g., in a memory) the appropriate property ID for the controller and/or other devices as needed. Then, the service tool device 501 can assign the appropriate property ID to the virtualized controller and/or other devices. Further, the service tool device 501 can switch communication protocol to a different communication protocol automatically to communicate with the controller and/or devices for retrieving appropriate information needed in order to identify that the appropriate property ID should be for creating the virtual device in the virtual network 600. Thus, the communication protocol switching can be performed on-the-fly automatically as needed.

With regard to the foregoing description, it is to be understood that changes may be made in detail without departing from the scope of the present invention. It is intended that the specification and depicted embodiment to be considered exemplary only, with a true scope and spirit of the invention being indicated by the broad meaning of the claims.

What is claimed is:

1. A device for automatic communication protocol switching between devices connected to a computer network system, comprising:
   a processor;
   a network interface connected to the processor; and
   a memory connected to the processor, including computer-readable and processor executable computer instructions:
      for communicating in a first communication protocol having a first bandwidth, and in a second communication protocol having a second bandwidth, and
      for switching between the first communication protocol and the second communication protocol for communicating data via the network interface,
      wherein when the processor executes the computer instructions, the processor determines which of the first communication protocol or the second communication protocol is to be selected, and communicates the data to a second computer network device using the selected one of the first communication protocol or the second communication protocol via the network interface, when the second computer network device is not able to receive the data transmitted from the processor using the first communication protocol, the processor transmits the data to the second computer network device using the second communication protocol, and the second computer network device receives the data from the processor sent via the second communication protocol, wherein the computer network system includes a HVAC system, and wherein:

the first communication protocol is based on a BACnet protocol, and the second communication protocol is a different protocol that is different from the first communication protocol, or the second communication protocol is based on the BACnet protocol, and the first communication protocol is the different protocol.

2. The device of claim 1, wherein the different protocol is a proprietary protocol.

3. The device of claim 1, wherein the different protocol is based on a non-BACnet protocol.

4. The device of claim 1, wherein the different protocol is based on the BACnet protocol.

5. A device for automatic communication protocol switching between devices connected to a computer network system, comprising:

a processor;

a network interface connected to the processor; and a memory connected to the processor, including computer-readable and processor executable computer instructions:

for communicating in a first communication protocol requiring a first bandwidth and in a second communication protocol requiring a second bandwidth, and for switching between the first communication protocol and the second communication protocol for communicating data via the network interface, wherein when the processor executes the computer instructions, the processor determines which of the first bandwidth or the second bandwidth is to be selected, and communicates the data to a second computer network device using the selected one of the first communication protocol or the second communication protocol via the network interface, when the second computer network device is not able to receive the data transmitted from the processor using the first communication protocol, the processor transmits the data to the second computer network device using the second communication protocol, and the second computer network device receives the data from the processor sent via the second communication protocol, wherein the computer network system includes a HVAC system, and wherein: the first communication protocol is a BACnet protocol, and the second communication protocol is a non-BACnet protocol, or the first communication protocol is the non-BACnet protocol, and the second communication protocol is the BACnet protocol.

6. A computer network system, comprising:

a HVAC system;

a network;

a first computer network device connected to the network; and a second computer network device connected to the network, wherein the first computer network device is configured to use a first communication protocol having a first bandwidth, and a second communication protocol having a second bandwidth, the first computer network device determines which of the first bandwidth or the second bandwidth is to be selected, and when the first computer network device selects the first bandwidth, the first computer network device transmitting data via the network using the first communication protocol to a second computer network device, and when the second computer network device cannot receive the data transmitted from the first computer network device using the first communication protocol, the first computer network device transmits the data to the second computer network device using the second communication protocol, and the second computer network device receives the data via the network from the first computer network device using the second communication protocol, and wherein: the first communication protocol is a BACnet protocol, and the second communication protocol is a non-BACnet protocol, or the first communication protocol is the non-BACnet protocol, and the second communication protocol is the BACnet protocol.

7. A computer implemented method for automatically switching communication protocols of a HVAC system, the method comprising:

a processor detecting a user input to a computer device connected to a network;

the processor converting the user input to data;

the processor selecting one of a first communication protocol having a first bandwidth, or a second communication protocol having a second bandwidth, the processor communicating the data to a second computer network device using the selected one of the first communication protocol or the second communication protocol via the network, wherein when the second computer network device cannot receive the data transmitted from the processor using the first communication protocol, the processor transmitting the data to the second computer network device using the second communication protocol, and the second computer network device receiving the data from the processor sent via using the second communication protocol, and wherein: the first communication protocol is a BACnet protocol, and the second communication protocol is a non-BACnet protocol, or the first communication protocol is the non-BACnet protocol, and the second communication protocol is the BACnet protocol.

8. A computer network system, comprising:

a HVAC system;

a network;

a first computer network device connected to the network; and a second computer network device connected to the network, wherein the first computer network device is configured to use a first communication protocol having a first bandwidth, and a second communication protocol having a second bandwidth, the first computer network device determines which of the first communication protocol or the second communication protocol is to be selected, and when the first computer network device selects the first communication protocol, the first computer network device transmitting data via the network using the first communication protocol to a second computer network device, and when the second computer network device cannot receive the data transmitted from the first computer network device using the first communication protocol, the first computer network device transmits the data to the second computer network device using the second communication protocol, and the second computer network device receives the data via the network from the first computer network device using the second communication protocol, and wherein:
the first communication protocol is based on a BACnet protocol, and the second communication protocol is a different protocol that is different from the first communication protocol, or the second communication protocol is based on the BACnet protocol, and the first communication protocol is the different protocol.

9. The computer network system of claim 8, wherein the different protocol is a proprietary protocol.

10. The computer network system of claim 8, wherein the different protocol is based on a non-BACnet protocol.

11. The computer network system of claim 8, wherein the different protocol is based on the BACnet protocol.

12. A computer implemented method for automatically switching communication protocols of a HVAC system, the method comprising:
a processor detecting a user input to a computer device connected to a network;
the processor converting the user input to data;
the processor selecting one of a first communication protocol having a first bandwidth, or a second communication protocol having a second bandwidth,
the processor communicating the data to a second computer network device using the selected one of the first communication protocol or the second communication protocol via the network,
wherein when the second computer network device cannot receive the data transmitted from the processor using the first communication protocol, the processor transmitting the data to the second computer network device using the second communication protocol, and the second computer network device receiving the data from the processor sent via using the second communication protocol, and wherein:
the first communication protocol is based on a BACnet protocol, and the second communication protocol is a different protocol that is different from the first communication protocol, or the second communication protocol is based on the BACnet protocol, and the first communication protocol is the different protocol.

13. The computer implemented method of claim 12, wherein the different protocol is a proprietary protocol.

14. The computer implemented method of claim 12, wherein the different protocol is based on a non-BACnet protocol.

15. The computer implemented method of claim 12, wherein the different protocol is based on the BACnet protocol.

* * * * *